United States Patent
Sempere Agullo et al.

(10) Patent No.: US 9,269,029 B2
(45) Date of Patent: Feb. 23, 2016

(54) DATA COMMUNICATION IN A PRINTING DEVICE

(75) Inventors: Jordi Sempere Agullo, Barcelona (ES); Narcis Simon Rabaseda, Sant Cugat del Valles (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/413,933

(22) PCT Filed: Jul. 12, 2012

(86) PCT No.: PCT/EP2012/063745
§ 371 (c)(1),
(2), (4) Date: Jan. 9, 2015

(87) PCT Pub. No.: WO2014/008944
PCT Pub. Date: Jan. 16, 2014

(65) Prior Publication Data
US 2015/0206037 A1    Jul. 23, 2015

(51) Int. Cl.
*G06F 15/00* (2006.01)
*G06K 15/02* (2006.01)
*G06K 15/10* (2006.01)
*G06K 15/00* (2006.01)

(52) U.S. Cl.
CPC ............ *G06K 15/1806* (2013.01); *G06K 15/10* (2013.01); *G06K 15/102* (2013.01); *G06K 15/4045* (2013.01)

(58) Field of Classification Search
CPC .................................................. G06K 15/1806
USPC ........................................................ 358/1.8
See application file for complete search history.

(56) References Cited

U.S. PATENT DOCUMENTS

| | | |
|---|---|---|
| 6,585,339 B2 | 7/2003 | Schloeman et al. |
| 6,866,367 B2 | 3/2005 | Szumla |
| 7,887,156 B2 | 2/2011 | Middleton et al. |
| 7,978,372 B2 | 7/2011 | Walmsley et al. |

(Continued)

FOREIGN PATENT DOCUMENTS

| | | |
|---|---|---|
| WO | 2004088577 A1 | 10/2004 |
| WO | 2011098345 A2 | 8/2011 |
| WO | 2014008944 A1 | 1/2014 |

OTHER PUBLICATIONS

Iwazawa, N. et al., "Printhead carriage transport high speed control system with robust compensator", Proceedings of the IECON '93, Nov. 15-19, 1993, pp. 2126-2131.

(Continued)

*Primary Examiner* — Saeid Ebrahimi Dehkordy (57) ABSTRACT

Apparatus and methods for the communication of data in a printing device are described. The apparatus enable communication between a control system and a plurality of printhead controllers. They have respective interface controllers for encoding and decoding one or more data streams that are communicated via a coupling medium. Print data is encoded for transmission as one or more data streams with a deterministic latency. Packet-based control data is also embedded in the one or more data streams. After receipt, the print data and the packet-based control data are extracted from the one or more data streams for control of at least the plurality of printhead controllers. Status data may also be encoded as a data stream and sent back to the control system.

15 Claims, 6 Drawing Sheets

(56) References Cited

U.S. PATENT DOCUMENTS

2011/0122184 A1   5/2011  Kimura et al.
2012/0050785 A1*  3/2012  Rudolph .............. G06F 3/1203
                                                  358/1.15

OTHER PUBLICATIONS

International Search Report and Written Opinion for PCT/EP2012/063745 dated Apr. 18, 2013, 12 pp.

* cited by examiner

| PBI Transaction Layer 310 | Mechanical Control 330 | Printhead Data Generation 340 |
|---|---|---|
| PBI Link Layer + Streaming Sub-Layer 320 | Other Real Time Data 350 | Printing Data 360 |
| Streaming Link Layer 370 | | |
| Physical Layer 380 | | |

DATA COMMUNICATION IN A PRINTING DEVICE

BACKGROUND

Certain printers use one or more printbars to print an image on a print medium. In an ink-jet printer, a printbar may comprise one or more printheads with a plurality of nozzles to eject liquid ink onto a print medium. Ink is ejected from each nozzle using a transducer. In a thermal ink-jet printer, the transducer comprises a nozzle resister; in other ink-jet printers the transducer may comprise a piezoelectric element. Continuous ink-jet printing is also possible, wherein ejected ink is directed onto a print medium using an electro-magnetic field. In most cases, the ejection of ink by a transducer is controlled by a voltage signal, sometimes referred to as a firing signal. Commonly, one or more printbars of a printing device are mounted above a media transport that transports a print medium along a path under said printbars. In these cases, ink is ejected across a gap formed below the one or more printbars and is deposited on to the print medium carried by the media transport.

Typically, a print controller or print engine needs to generate firing signals for a plurality of printheads located in one or more printbars based on an image to be printed. Due to the location of the one or more printbars above the media transport, the print controller or print engine is often located in a central printer structure or in a coupled computing device. The print controller or print engine thus sends nozzle firing signals to individual printheads over a plurality of printhead data lines that extend between the central printer structure (or coupled computing device) and the printbar. The nozzle firing data is unidirectional and time-dependent; the transducers need to be accurately controlled in time in order to print a suitable image on a print medium. In many cases it is also not possible to guarantee when the printing data will be generated; for example, this depends on the image to be printed and real-time processes such as those based on encoder signals and print media location. A printhead monitoring and control bus may also be supplied. Since the printing data flow is unidirectional and it is not possible to guarantee when the printing data will be generated, the printhead control data needs to travel on its own control bus.

Existing configurations are suitable for scanning printer configurations with a relatively low number of printheads. However, as the number of printheads increase, for example as found in page-wide-array, there are problems with a reliability of communicated data and hardware complexity and cost.

BRIEF DESCRIPTION OF THE DRAWINGS

Various features and advantages of the described examples will be apparent from the detailed description which follows, taken in conjunction with the accompanying drawings, which together illustrate, by way of example only, features of the examples, and wherein.

DETAILED DESCRIPTION

In the following description, for purposes of explanation, numerous specific details are set forth in order to provide a thorough understanding of the present apparatus and systems. It will be apparent, however, to one skilled in the art that the present apparatus, systems and methods may be practiced without these specific details. Reference in the specification to "an example" or similar language means that a particular feature, structure, or characteristic described in connection with the example is included in at least that one example, but not necessarily in other examples.

Figure 1:
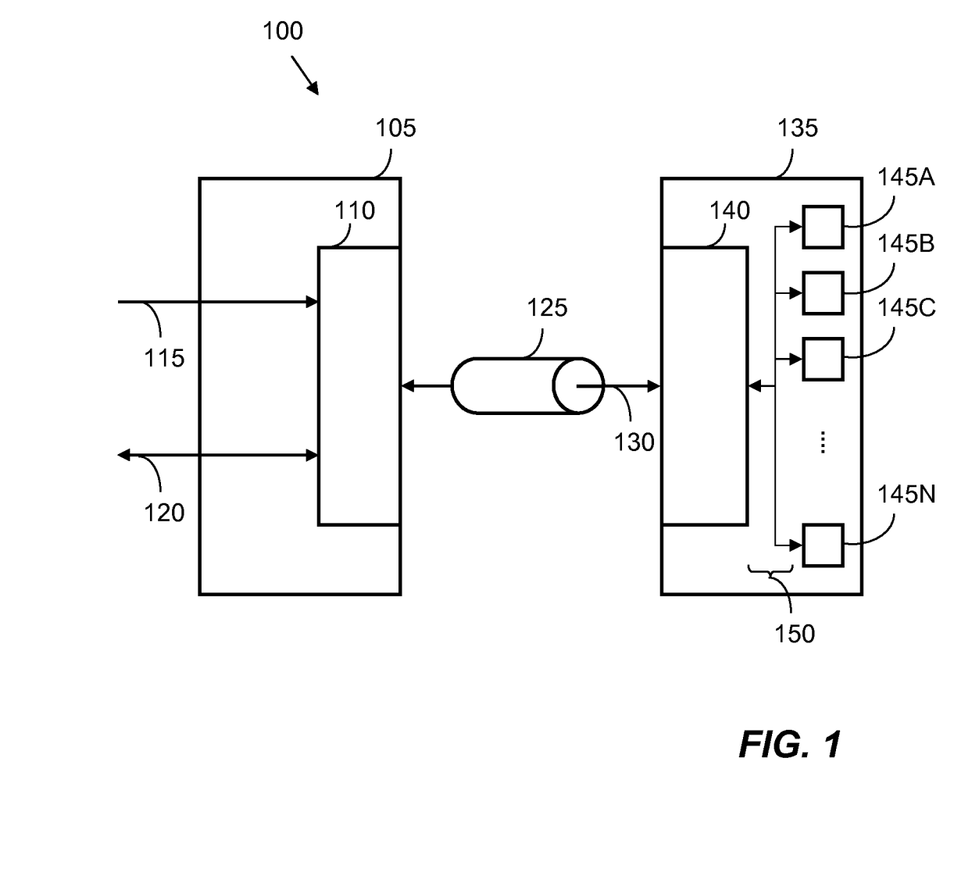
FIG. 1 is a schematic diagram of at least a portion of a printing device according to an example.

FIG. 1 shows a portion of a printing device 100 according to an example. The printing device comprises a control system 105. The control system 105 receives image data 115 for use in a printing operation. For example, the image data 115 may be received from a computing device (not shown) coupled to, or forming part of, the control system 105. The image data 115 may comprise data associated with an image to be printed on a print medium by the printing device. The image data 115 may comprise halftone data. The control system 105 also sends and receives packet-based control data 120. The control data 120 is referred to as 'packet-based' because it is sent and received in packets, i.e. discrete blocks of data of a predefined size. The packets used to communicate the control data 120 may comprise a data or payload portion comprising a fixed-number of bits or bytes of control data encapsulated in a control wrapper. The control wrapper may comprise a predefined number of header and/or footer bits or bytes. The control wrapper may comprise, amongst others: data to route packets (e.g. may specify a source and/or destination hardware address); data for error correction and/or detection; data defining one or more control protocols; data indicating a time-to-live value; data indicating related packets etc. While the packet-based control data 120 may need to be received within a particular time window (for example as defined by a time-to-live value) it does not require a deterministic latency, i.e. packets of control data 120 can accommodate variations in travel times between a source and a destination.

The control system 105 comprises a first interface component 110 arranged to receive the image data 115 and to communicate (i.e. to send and/or receive) packet-based control data 120. The first interface component 110 is communicatively coupled to a coupling medium 125. The coupling medium couples the control system 105 to a remote printbar 135, i.e. a printbar that is a set distance from the control system 105. The set distance is greater than a distance that would allow the control system 105 and the printbar 135 to be connected by conductive traces (e.g. on the order of meters). The printbar 135 comprises a second interface component 140 that is communicatively coupled to the coupling medium 125. The control system 105 is separate from the printbar 135, for example it may be mounted or installed in a different section of a structure of the printing device. The second interface component 140 receives data from the coupling medium 125 and distributes print and control data to a plurality of printhead controllers 145. In FIG. 1 there are N printhead controllers (145A, 145B, 145C ... 145N), wherein each printhead controller is communicatively coupled to the second interface component 140 via one or more signal lines 150. Each printhead controller 145 controls one or more printheads. In certain example, the printheads are mounted on the printbar together with the printhead controller 145.

According to certain examples described herein problems of reliability and complexity are addressed by combining print data with monitor and control traffic over a common serial link. This allows low and deterministic latency for real-time print data along with error detection and retransmission capabilities for printhead control data. It is also scalable to a large number of printheads. Referring to the example of FIG. 1, the first interface component 110 combines print data derived from image data 115 and packet-based control data 120 in one or more data streams 130 that have a deterministic latency. Deterministic latency, in this case, is achieved by combining the different channels, i.e. one or more channels associated with print data and one or more channels used to send and/or receive packet-based control data. The channels may be combined by multiplexing them in time. This results in a system where a required latency for the print data is met irrespective of data that is sent as packet-based control data; e.g. irrespective of whatever and/or whenever data is sent as packet-based control data. This means that print data channels maintain their latency properties, which is critical for the printing data arrive at a printhead at the right time.

The data streams 130 are then communicated over the coupling medium 125. The second interface component 140 receives the one or more data streams 130 and extracts the print data and packet-based control data, which is then relayed to at least one of the plurality of printhead controllers 145 over signal lines 150. As shown in FIG. 1, the second interface component 140 is also arranged to receive control data from at least one of the plurality of printhead controllers 145 over signal lines 150 and transmit said control data as one or more data streams 130 over the coupling medium 125. These one or more data streams 130 are then received by the first interface component 110, which extracts the control data for onward communication, for example to a print controller or print engine, as packet-based control data 120.

In any printer operation, ink-jet printheads need to be remotely controlled and monitored at regular intervals. In comparative examples, this has been accomplished by using low-speed input/output (I/O) interfaces that are independent of the real time printing data lines. In this case, low-speed may be interpreted as approximately on an order of $\sim 10^0$ or $\sim 10^1$ mega-bits-per-second (Mbps) and below. These I/O interfaces traverse long distances across a structure ($\sim 10^0$ or $\sim 10^1$ meters) of the printing device. As the number of printheads increases, as found with page-wide-array printer configurations, the number of control lines also increases, leading to complex wiring schemes. These, in turn, reduce the reliability and make the assembly and maintenance of the printer more complex. In certain examples described herein, a wiring problem between a print controller or engine, for example housed in a central electronics structure, and one or more printbars of a printing device, such as a page-wide-array printer, is addressed by encoding print and packet-based control data as one or more data streams, which then allows the use of a single coupling medium per printbar.

Figure 2:
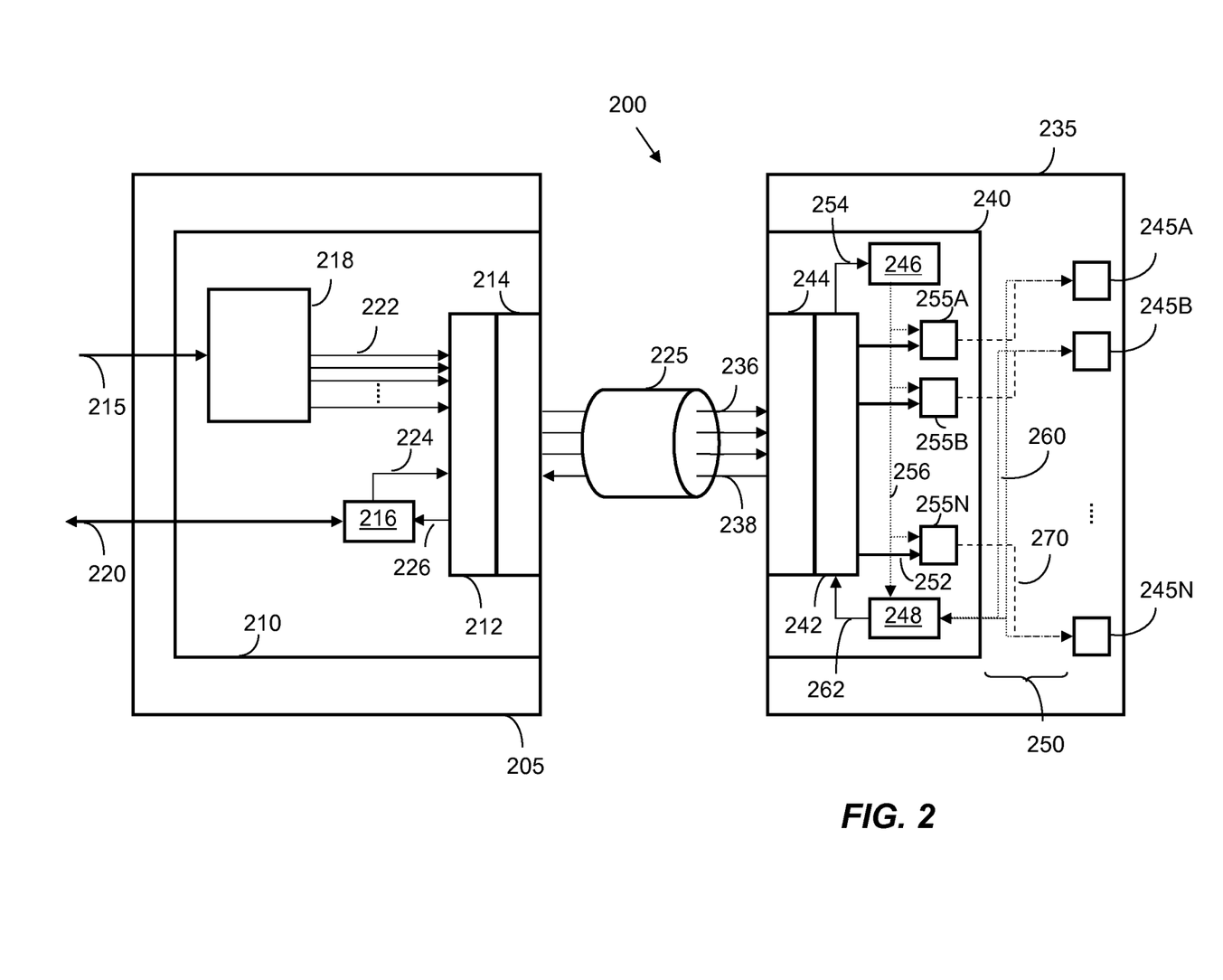
FIG. 2 is a schematic diagram of at least a portion of a printing device according to another example.

FIG. 2 shows at least a portion of a printing device 200 according to another example. Similar reference numerals are used for features that are related to those shown in FIG. 1. The printing device 200 comprises a control system 205 and a printbar 235 communicatively coupled via coupling medium 225. The control system 205 receives halftone data 215 and packet-based control data 220. The control system 205 also sends packet-based control data 220, for example over a network or to a computing device. The control system 205 comprises a first interface component 210. The first interface component 210 may comprise a field-programmable gate array (FPGA). The first interface component 210 comprises a first link-layer component 212 and a first transceiver 214 for encoding and transmitting one or more data streams 236 to the printbar via the coupling medium 225. The first link-layer component 212 and the first transceiver 214 are also arranged and constructed to receive and decode one or more data streams 238 from the printbar via the coupling medium 225.

In FIG. 2 the halftone data 215 is received by a print-data generator 218. Print-data generator 218 comprises logic configured to generate print data with a deterministic latency. By the term 'deterministic latency' it is meant that there is a fixed upperbound on a range of time delays (i.e. latencies) for data signals that can be tolerated by control circuitry. In some cases there may be a fixed latency value that is expected. There may also be a minimum latency value. If data signals are received that have a time delay outside of a predetermined range then the control circuitry may not function or produce an erroneous output. In the example of FIG. 2 the print-data generator 218 receives the halftone data 215, which may be image data, and converts it into a plurality of print data signals 222 for the printhead controllers. For example, in one implementation the print-data generator 218 may generate a print data signal for each die on a printer pen, wherein the printer pen forms part of a print head module. If there is a one-to-one mapping between printer pens and printhead controllers, a plurality of printhead controllers m and a plurality of dies n (i.e. silicon dies comprising transducers for ejecting ink), then m*n print data signals may be generated. Other implementations may have different formats for the print data signals depending on the particular printing equipment that is used. The plurality of print data signals 222 are received by the first link-layer component 212. The first link-layer component 212 of the first interface component 210 is arranged to encode the plurality of print data signals 222 as one or more data streams 236, i.e. perform link-layer processing, before the one or more data streams are transmitted to the printbar 235 by the first transceiver 214. During a print operation, the first link-layer component 212 is arranged to continuously transmit data to the print bar with a deterministic latency, which may be the same deterministic latency enforced by the print-data generator 218.

In addition to the print-data generator 218, the first interface component 210 also comprises a first packet-based control component 216. The first packet-based control component 216 sends and/or receives packet-based control data 220. The first packet-based control component 216 receives packet based control data 220, for example from a computing device (not shown) and appropriately forwards control packets 224 to the first link-layer component 212. Appropriately forwarding control packets may comprise performing a first set of packet-processing operations. The first packet-based control component 216 may be a packet-based-interface (PBI) host. The first packet-based control component 216 is arranged to use the first link-layer component 212 to embed control packets 224 in the one or more data streams 236 carrying the print data (i.e. the data carried by the plurality of print data signals 222) with a deterministic latency. The first packet-based control component 216 is also arranged and constructed to receive status and control data 226 extracted from one or more data streams 238 received from the coupling medium 225 by the first transceiver 214 and processed by the first link-layer component 212. For example, the status and control data may comprise one or more responses received from one or more packet-based control components operating on the printbar 235, and these responses may be used to determine whether one or more packets need to be re-transmitted, for example by the first packet-based control component 216. This then provides a high tolerance to transmission errors.

Turning to the printbar 235 in FIG. 2, a second interface component 240 comprises a second transceiver 244 and a second link-layer component 242. The second transceiver 240 receives the one or more data streams 236 transmitted by the first transceiver 214 of the first interface component 240. The second transceiver 240 is arranged to pass received data to the second link-layer component 242. The second link-layer component 242 extracts the plurality of print data signals 252 and forwards them on to respective printhead controllers. The second link-layer component 242 also extracts packet-based control data 254 from the one or more data streams 236 and forwards this to a second packet-based control component 246.

In the example of FIG. 2, print data signals 252 for a particular printhead controller are first sent to a serializer 255. The print data signals, like print data 222, may comprise a binary stream. The second interface component 240 comprises a plurality of serializers, one for each printhead module or controller 245 (i.e. serializer 255A for printhead controller 245A, serializer 255B for printhead controller 245B, etc. until serializer 255N for printhead controller 245N). Each serializer 255 also receives packet-based control data 256 from the second packet-based control component 246. In certain examples, the print data signals 252 and the packet-based control data 256 are multiplexed by the serializers. In the example of FIG. 2, the second packet-based control component 246 may comprise a repeater with N outputs arranged to identify a control packet for an nth printhead controller and to send the control packet on an nth signal line to an nth serializer. If each printer pen comprises 6 dies, then each serializer 255 may comprise a 7b/8b interface to encode 7 bits of received binary data (print data streams for 6 dies and a data stream for the control data) as 8 bits, i.e. 7b/8b encoding, which can then be serialized by the serializer 255 and transmitted to each printhead controller 255 over data and control signal lines 270. A latency of print data signals is kept deterministic during the transcoding process (i.e. during the 7b/8b encoding).

The second interface component 240, which in certain cases is mounted on the printbar 235, is thus capable of receiving a stream of print and control data and then distributing the received information to individual print heads through much shorter and cheaper cables. The second interface component 240 may also comprise a FPGA device.

The second interface component 240 of FIG. 2 also comprises a third packet-based control component 248. The third packet-based control component 248 is communicatively coupled to the second packet-based control component 246 and receives control data 256. The third packet-based control component 248 may comprise a PBI device. In the example of FIG. 2, the third packet-based control component 248 has a number of functions. Firstly, it is arranged to receive commands from the first packet-based control component 216 addressed to itself. Secondly, it is communicatively coupled to each of the printhead controllers 245 via status signal lines 260. Status signal lines 260 form part of signal lines 250 with data and control signal lines 270. Through status signal lines 260 the third packet-based control component 248 is arranged to gather status data for transmission to the control system 205, and in turn the first packet-based control component 216. The third packet-based control component 248 may also gather status and control data from other control circuitry mounted on the printbar 235, for example, the second interface component 240 itself. Thirdly, the third packet-based control component 248 may generate one or more interrupts to trigger an action within one or more processors forming part of the control system 205.

In any case, the third packet-based control component 248 generates status and control data 262 that is sent to the second link-layer component 242. The second link-layer component 242 is arranged to encode the status and control data 262 as one or more data streams 238 for transmission to the control system 205 by the second transceiver 244. In certain implementations the third packet-based control component 248 and the second packet-based control component 246 may be combined in a single device.

Figure 3:
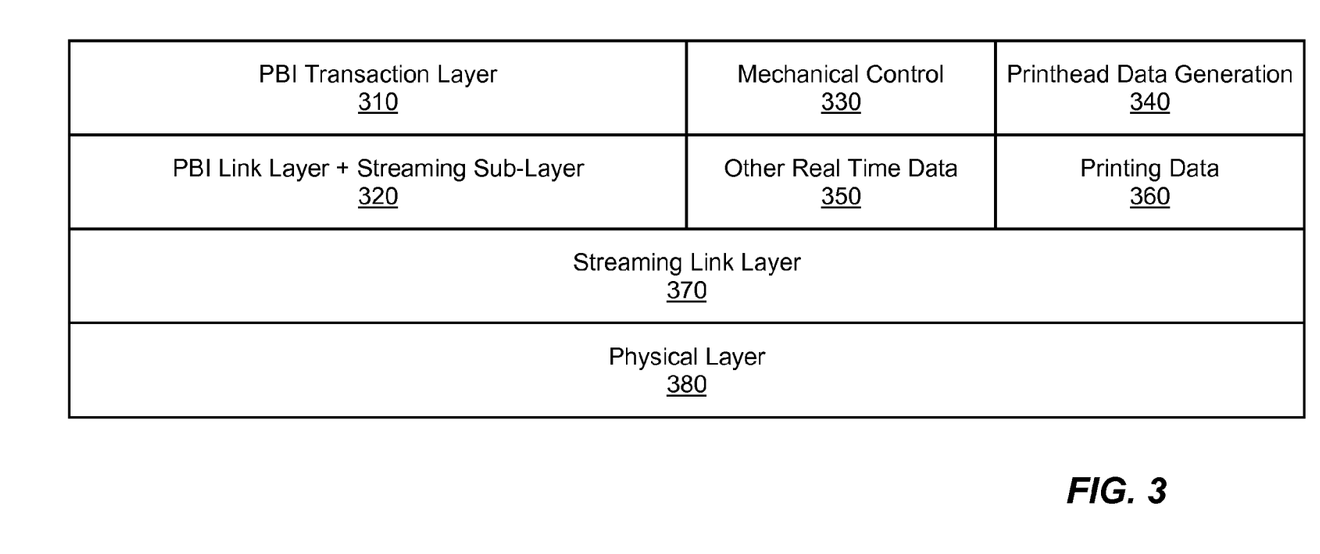
FIG. 3 is schematic diagram of a number of communication layers for printer communications according to an example.

FIG. 3 is a schematic diagram showing a communications stack or layer model according to an implementation example. PBI layers are implemented in one or more of the packet-based control components 216, 246 and 248. Printhead Data Generation and Printing Data layers are implemented in print-data generator 218. They generate the print data that needs to be transmitted. Stream Link Layer 370 and Physical Layer 380 are implemented in one or more of transceivers 214, 244 and serializers 255. Each layer in the stack or model may represent a different level of encoding and/or data encapsulation. At a first level there is a PBI transaction layer 310 that forms part of a PBI protocol used for monitoring and control one or more printheads and, in certain case, one or more electronics subsystems, such as other FPGAs, sitting on a printbar. In one example, the monitoring and control functions are implemented by computer program code that is retrieved from memory and processed by one or more processors of a computing device, such as a computing device coupled to the control system 105 or 205. The PBI transaction layer 310 may be a level in which monitoring and control transactions, commands and/or requests are implemented; for example, each packet of control data may belong to a particular transaction such as a status request address to a printhead controller. At the same level as the PBI transaction layer 310 there are protocols relating to mechanical control 330 and printhead data generation 340. For example, printhead data generation protocol 340 may correspond to procedures used by the print-data generator 218, for example commands used by a FPGA implementing the first interface component 110 or 210. The mechanical control protocol 330 may correspond to procedures used by control circuitry (not shown in FIGS. 1 and 2) for controlling other components of the printing device, for example commands used by a FPGA implementing the first interface component 110 or 210 to control position encoders for controlling a media transport.

At a second level there are protocols that receive and, in some cases, encapsulate data from the first level. PBI link layer and streaming sub-layer 320 comprise protocols that define how data from the PBI transaction layer 310 is to be processed before sending to a streaming link layer 370. For example, they may define how data from the PBI transaction layer 310 is to be encapsulated to implement addressing, error detection and/or retransmission functions. The first, second and third packet-based control components 216, 246 and 248 may implement processing in this layer. The PBI link layer and streaming sub-layer 320 may also comprise protocols defining how packet-based control data is to be prepared for transmission as one or more data streams; for example, may define protocols for preparing data from the PBI transaction layer 310 for embedding in a data stream at the streaming link layer 370. The first and second link-layer components 212 and 242 may also perform processing for the PBI Link Layer and Streaming Sub-Layer 320.

Also at a second level are protocols that define other real time data 350 and printing data 360. For example, a protocol defining other real time data 350 may define how mechanical control 330 commands or transactions are communicated to control devices such as encoders and how data such as encoder pulses and column sync pulse are to be structured. In certain cases, the protocol defining other real time data 350 sets out a specification for communicating real-time, time-dependent signals from FGPA devices. Printing data 360 defines how data generated according to printhead data generation protocols 340 is to be structured and/or communicated. For example, printing data 360 may be communicated in real-time according to simplex protocols that maintain a deterministic latency.

At a third level there is a streaming link layer protocol 370. This may be implemented by the first and second transceivers 214 and 244 and, in certain cases, the first and second link-layer components 212 and 242. The streaming link layer protocol 370 may specify how link setup, error detection procedures and/or reporting are to be performed. The streaming link layer protocol 370 sets the format for the one or more data streams 236 and/or 238 that are to be communicated over the coupling medium. The streaming link layer protocol 370 may be based on existing standards such as the low voltage differential signaling (LVDS) standard.

At a fourth level there is a Physical Layer protocol 380 which encompasses three sub-protocols: PCS (Physical Coding Sublayer), PMA (Physical Medium Attachment sublayer) and PMD (Physical Medium Dependent sublayer).

Figure 4A:
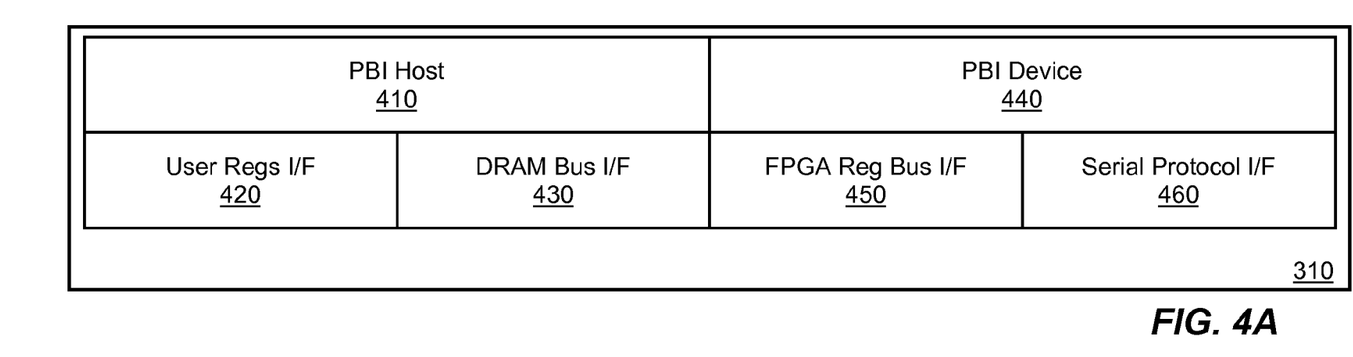
FIG. 4A is a schematic diagram of components of a packet-based interface transaction layer according to an example.

FIG. 4A shows an implementation of the PBI transaction layer 310. In FIG. 4A the specifications for the PBI transaction layer 310 are split into two groups: a first group of specifications associated with a PBI Host 410, which may be the first packet-based control component 216, and a second group of specifications associated with a PBI Device 440, which may be the third packet-based control component 248. For example, the first group of specifications associated with a PBI Host 410 may comprise specifications for a user register interface (I/F) 420 and a memory interface such as a Dynamic Random Access Memory (DRAM) bus interface (I/F) 430. The second group of specifications associated with a PBI Device 410 may then comprise specifications for an FPGA Control and Status Register Bus (I/F) 450 and a serial protocol interface 460 such as SPI (Serial Peripheral Interface), UART (Universal Asynchronous Receiver/Transmitter) or others to communicate with external devices.

Figure 4B:
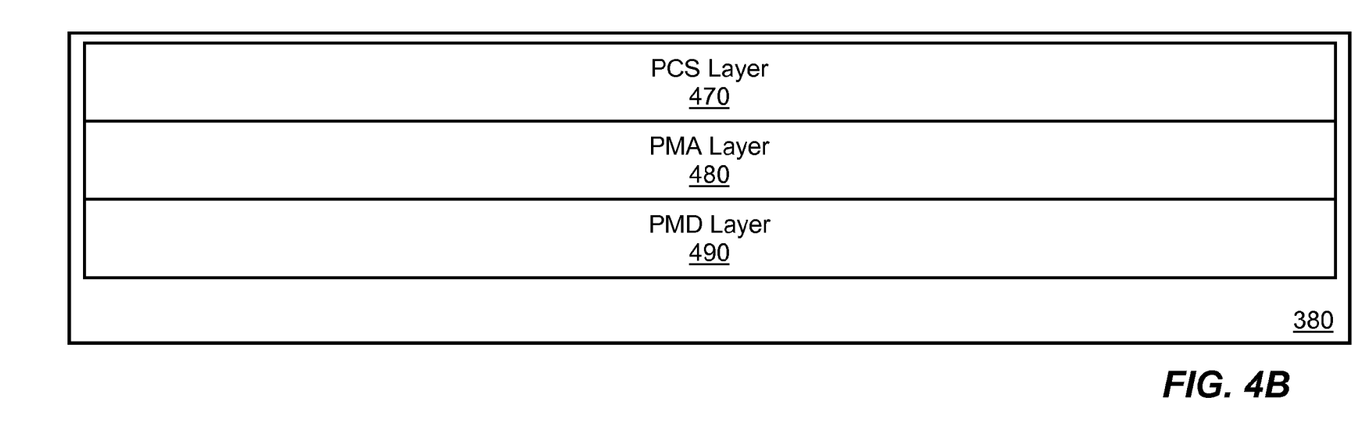
FIG. 4B is a schematic diagram of components of a physical layer according to an example.

FIG. 4B shows component parts of the Physical Layer protocol 380. The PCS layer 470 defines the specifications for one or more of transmit phase compensation and transcoding, such as 8b/10b encoding for transmitting over the coupling medium. The PMA layer 480 defines the specifications for one or more of serialization and deserialization and byte alignment. The PCS layer 470 and PMA layer 480 may define how the plurality of serializers 255 process and communicate data. The PMD layer 490 defines the logical and electrical specifications for using the physical coupling medium, for example single or double data rate signals, or LVDS or PCML (Pseudo Current Mode Logic) transceivers.

In one implementation, the coupling medium 225 comprises a cable that complies with the DisplayPort standard defined by the Video Electronics Standards Association (VESA). In this case, the cable is adapted for use as the coupling medium 225 described in the examples, the digital data and/or electrical format of the signals being communicated need not comply with the standard uses for video data according to VESA. In one configuration up to 10 Gbps (giga-bits-per-second) may be transported to the printbar by the coupling medium using four 2.5 Gbps differential uplink data channels. A downlink data channel may also be configured to transmit a data stream at 2.5 Gbps from the printbar to the control system. In other implementations, the coupling medium may comprise, amongst others, a copper cable or one or more optical links. The coupling medium that is used may be selected depending on one or more of the performance, dimensions and cost constraints of the printing device. Optical links have an advantage of offering higher data rates. In optical systems a Quad Small Form-factor Pluggable (QSFP) device may be used as part of the first and second interface components to interface between FPGA hardware and fibre optic components. A signal conditioner may be used for copper cabling. Coupling media that enable data rates of Gbps and above are referred to herein as high-speed media. The data streams transmitted over the coupling media are effectively a form of serialized data that is deserialized at the printbar (in addition to the serialization of serializes 255). The coupling medium may be simplex, half-duplex or duplex.

Figure 5:
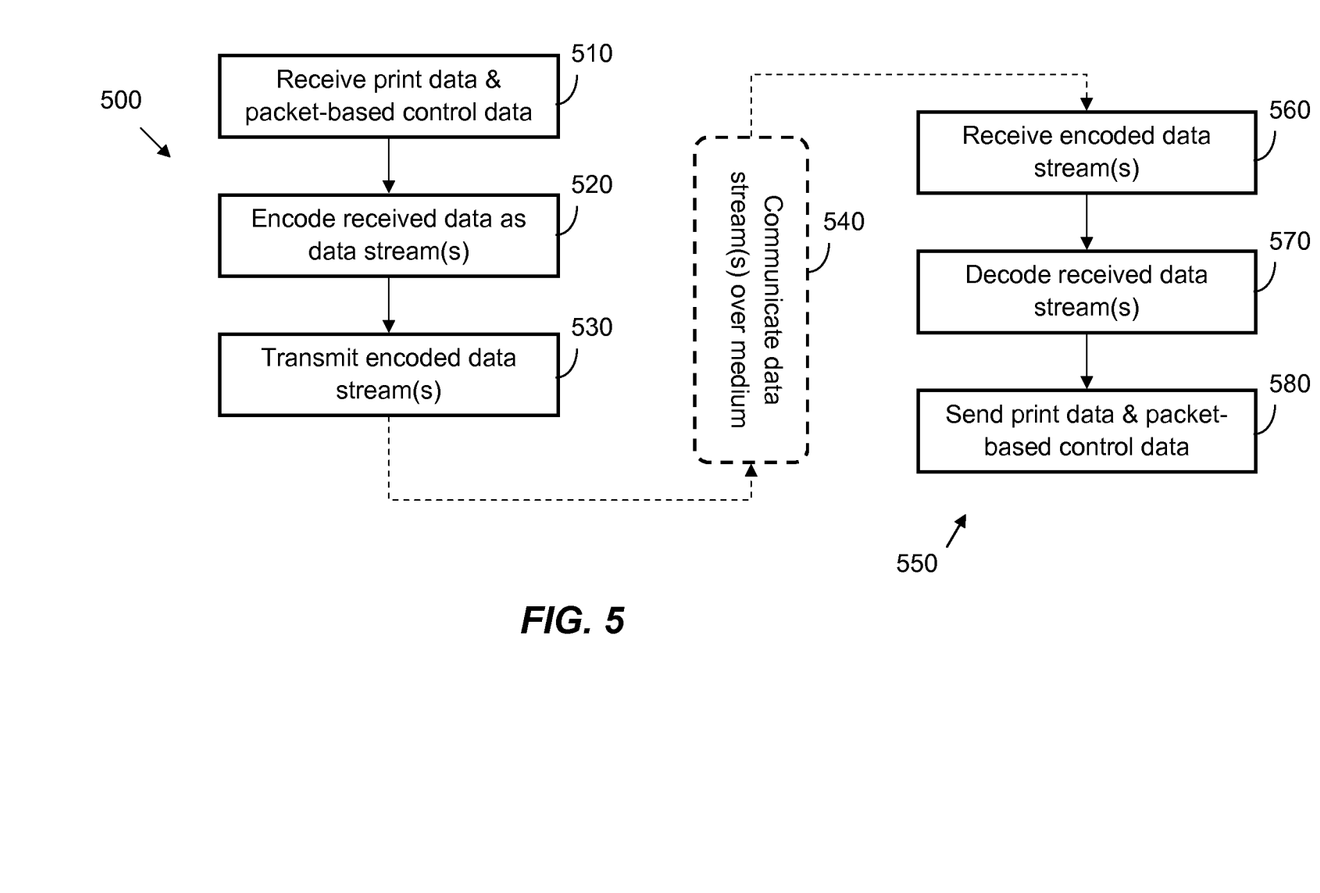
FIG. 5 is a flow diagram showing a method of communicating data in a printing device according to an example.

FIG. 5 shows two portions 500 and 550 of a method for communicating data in a printing device. Portion 500 comprises a number of blocks for sending data from a control system to a plurality of printhead modules. The blocks within portion 500 are performed within the control system, which may be control system 105 or 205. At block 510 print data and packet-based control data is received. The print data may comprise image 115, halftone data 215 and block 510 may comprise an additional sub-block of converting said data 115 and 215 into a plurality of print data signals 222. At block 520 print data and packet-based control data is encodes as one or more data streams with a deterministic latency. This may be performed by one or more of the first packet-based control component 216 and the first link-layer component 214. At block 530 the encoded data streams are transmitted. This may be performed by a dedicated transmitter or a transceiver such as the first transceiver 214.

In FIG. 5 block 540 represents the communication of the one or more data streams over a coupling medium. The method then continues to portion 550 which represented blocks for receiving data from a control system for distribution to one or more printhead modules. Portion 550 may be performed at one or more printbars in a printing system. At block 560 the encoded data streams are received, for example by a dedicated receiver or a transceiver such as the second transceiver 244. At block 570 the received data streams are decoded. This may be performed by one or more of the second link layer component 242, the second packet-based control component 246 and the third packet-based control component 248 depending on the implementation. Decoding the received data streams comprises extracting packet-based control data and print data. At block 580 the print data and packet-based control data are distributed (e.g. sent) to appropriate control circuitry associated with the printhead modules. In one case, the packet-based control data may be sent to a repeater for distribution to one or more printhead modules in an appropriate form. This may involve serializing print data and control data for distribution to one or more printhead modules. The printhead modules may comprise printhead controllers for controlling one or more printheads according to the print data and control data.

Figure 6:
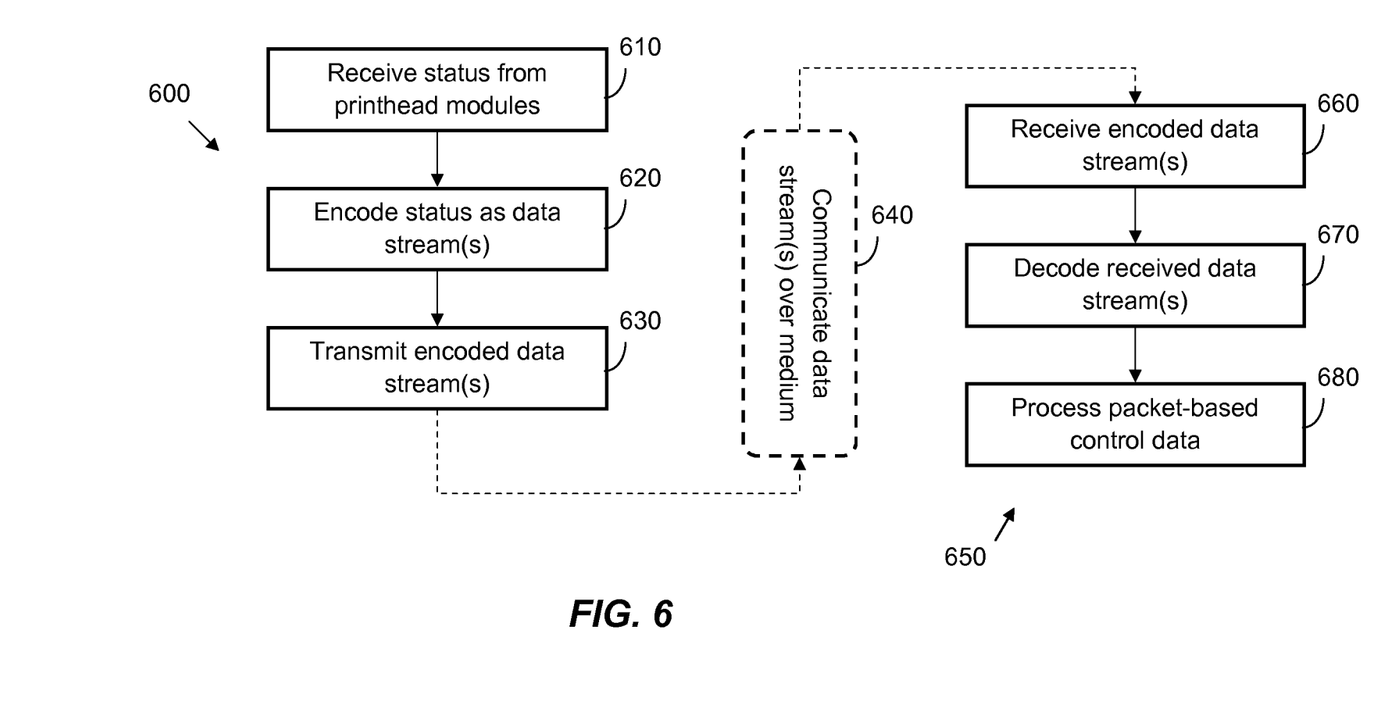
FIG. 6 is a flow diagram showing another method of communicating data in a printing device according to an example.

FIG. 6 shows two portions 600 and 650 of a method for communicating data in a printing device. Portion 600 comprises a number of blocks for sending data to a control system from a plurality of printhead modules. The blocks within portion 600 may be performed within a printbar such as printbars 135 or 235, or within any other suitable mounting for one or more printhead modules such as a carriage. At block 610 an indication of a status of one or more printhead modules is received. A status may relate to, amongst others, printhead communication errors, temperature & voltage information, etc. This may comprise receiving control data from one or more printhead controllers over signal lines such status signal lines 260. At block 620 the indication of a status is encoded as one or more data streams. This may be performed by one or more of the third packet-based control component 248 and the second link-layer component 242, for example the third packet-based control component 248 may receive status data from one or more printhead controllers and forward this status data in an appropriate form to the second link-layer component 242 for encoding. At block 630 the encoded data streams are transmitted. This may be performed by a dedicated transmitter or a transceiver such as the second transceiver 242.

In FIG. 6, block 640 represents the communication of the one or more data streams over a coupling medium. The method then continues to portion 650 which represented blocks for receiving data at a control system from one or more printhead modules. Portion 650 may be performed at control system 105 or 205. At block 660 the encoded data streams are received, for example by a dedicated receiver or a transceiver such as the first transceiver 214. At block 670 the received data streams are decoded. This may be performed by one or more of the first link layer component 212 and the first packet-based control component 216, for example the first link layer component 212 may extract packet-based control data 226 that is forwarded to the packet-based control component 216 for analysis and processing at block 680.

The preceding description has been presented only to illustrate and describe examples of the principles described. This description is not intended to be exhaustive or to limit these principles to any precise form disclosed. Many modifications and variations are possible in light of the above teaching.

What is claimed is:

1. Apparatus for communicating with a plurality of remote printhead controllers of a printing device comprising:
a first interface controller electrically coupled to a control system and a coupling medium, the first interface controller being arranged to receive a plurality of data signals associated with a printing operation, encode said signals in one or more data streams and send the encoded signals to the coupling medium,
wherein the first interface controller comprises:
a first streaming controller arranged to receive print data derived from said plurality of data signals for transmission as one or more data streams with a deterministic latency, the print data representing image data to be printed by the printing device, and
a first packet-based control component to receive packet-based control data derived from said plurality of data signals and to send said packet-based control data for embedding in the one or more data streams generated by the streaming controller, the packet-based control data regarding how the image data is to be printed by the printing device.

2. Apparatus according to claim 1, wherein the first streaming component comprises:
a first link-layer component arranged to encode the print data and the packet-based control data as one or more data streams; and
a first transmitter for transmitting the one or more data streams using the coupling medium.

3. Apparatus according to claim 2, wherein the first streaming component comprises:
a first receiver to receive one or more data streams from the coupling medium,
wherein the first link-layer component is arranged to decode the one or more received data streams to extract packet-based control data for transmission to the first packet-based control component.

4. Apparatus according to claim 1, comprising:
a print data generator to receive at least a portion of the plurality of data signals and generate deterministic print data for encoding as one or more data streams by the first streaming controller.

5. Apparatus according to claim 1, wherein the plurality of remote printheads are mounted in a remote printbar and the packet-based control data comprises control data for circuitry in said printbar.

6. Apparatus for a printing device, comprising:
a second interface controller electrically coupled to a coupling medium and a plurality of printhead controllers, the second interface controller being remote from a control system and arranged to receive one or more encoded data streams sent over the coupling medium, decode said one or more encoded data streams to obtain a plurality of signals associated with a printing operation, and send said signals to the plurality of printhead controllers,
wherein the second interface controller comprises:
a second streaming controller arranged to receive one or more data streams with a deterministic latency and convert said one or more data streams into print data for the plurality of printhead controllers, and
a second packet-based control component to receive packet-based control data extracted from the one or more data streams received by the streaming controller.

7. Apparatus according to claim 6, wherein the second streaming component comprises:
a second receiver for receiving the one or more data streams from the coupling medium; and
a second link-layer component arranged to decode the one or more data streams to extract the print data and the packet-based control data.

8. Apparatus according to claim 7, wherein the second streaming component comprises:
a second transmitter to transmit one or more data streams using the coupling medium,
wherein the second link-layer component is arranged to encode packet-based control data from control circuitry as one or more data streams for transmission.

9. Apparatus according to claim 8, comprising:
a third packet-based control component arranged to receive status data from at least one of the plurality of printhead controllers and send said status data to the second link-layer component as packet-based control data.

10. Apparatus according to claim 6, wherein the second packet-based control component comprises:
a repeater to transmit extracted packet-based control data to at least one of the plurality of printhead controllers.

11. Apparatus according to claim 6, comprising:
a plurality of serializers, each serializer arranged to receive print data and packet-based control data for a printhead controller from the plurality of printhead controllers and to serialize said data for transmission to said printhead controller.

12. A method of communicating with a plurality of remote printhead controllers of a printing device comprising:
receiving, at an interface component of a print control system, print data and packet-based control data associated with a printing operation;

encoding said print data and packet-based control data signals in one or more data streams, said one or more data streams having a deterministic latency, by multiplexing one or more channels of the packet-based control data signals and one or more channels of the print data; and transmitting the encoded signals to the plurality of remote printhead controllers over a coupling medium.

13. A method according to claim 12, comprising:

receiving one or more data streams over the coupling medium; and decoding said received one or more data streams to extract packet-based control data indicating a status from one or more of the plurality of remote printhead controllers.

14. A method of operating a printing device, comprising:

receiving, from a coupling medium at an interface component of a printbar remote from the control system, one or more encoded data streams with a deterministic latency;

decoding said one or more encoded data streams to obtain print data and packet-based control data associated with a printing operation; and sending said print data and said packet-based control data to at least a plurality of printhead controllers.

15. A method of operating a printing device according to claim 14, comprising:

encoding packet-based control data indicative of a status from one or more of the plurality of printhead controllers as one or more data streams; and transmitting said encoded one or more data streams over the coupling medium.

* * * * *